Aug. 4, 1925.

Re. 16,130

F. O. LAKE

CLOTHESLINE HANGER

Original Filed Nov. 15, 1921

Inventor

Fred O. Lake.

By Cushman Darby & Cushman

Attorneys

Reissued Aug. 4, 1925. Re. 16,130

UNITED STATES PATENT OFFICE.

FRED O. LAKE, OF PARK LANE, VIRGINIA, ASSIGNOR TO CHARLES THORNDIKE AND EDWARD J. BREYERE, BOTH OF WASHINGTON, DISTRICT OF COLUMBIA.

CLOTHESLINE HANGER.

Original No. 1,423,530, dated July 25, 1922, Serial No. 515,286, filed November 15, 1921. Application for reissue filed July 23, 1924. Serial No. 727,843.

*To all whom it may concern:*

Be it known that I, FRED O. LAKE, a citizen of the United States, residing at 200 Lee Highway, Park Lane, in the county of Arlington and State of Virgina, have invented certain new and useful Improvements in Clothesline Hangers, of which the following is a specification.

This invention relates to improvements in clothesline hangers, and particularly to devices wherein a peculiar structure and ingenious configuration of the parts enables the user to secure the clothes line in position at the desired tension without knots or complicated twistings of the rope.

A primary object of the invention is to produce a hanger of this character which will be strong and durable, easy to manufacture and readily attached to a support by nails, screws or similar means.

With these and other objects in view as may become apparent from the disclosure, the invention consists in the novel combination of elements, construction and arrangement of parts, operation and specific features to be hereinafter enlarged upon and sought to be covered in the subjoined claims, the invention being illustrated in the accompanying drawings, wherein:—

Similar reference characters refer to like parts throughout the several views.

My device consists of three main parts, namely:—a base part A, a line support part B, and a locking part C.

Figure 3:
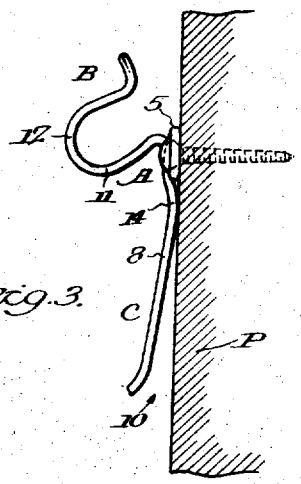
Figure 3 is a side elevation.
Figure 4:
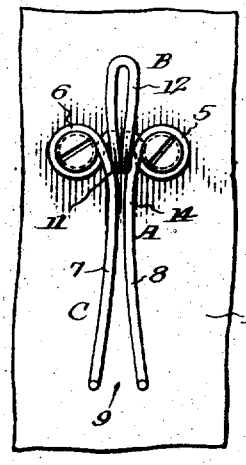
Figure 4 is a front elevation.

The base part consists of two eyelets 5 and 6 by which the device is secured to a support or post P. These eyelets are formed by bending a heavy wire, as "No. 9" wire, into two loops which are brought close together and the depending ends 7 and 8 extended downwardly to form a V-shaped clamp 9, as well as forwardly as shown in Figure 3, to form with the support a similar V-shaped clamping space 10. The looped wire above the base part is then brought together and bent outwardly as at 11 and again bent upwardly as at 12 to form a hanger or loop around which the clothes line may be passed.

This arrangement of parts forms a peculiarly sturdy fixture and its point of contact 14 with the wall or post and its two points of attachment 5 and 6 produce a three-point suspension which will withstand a tremendous pull, either in line with the wall or at right angles to it.

Figure 1:
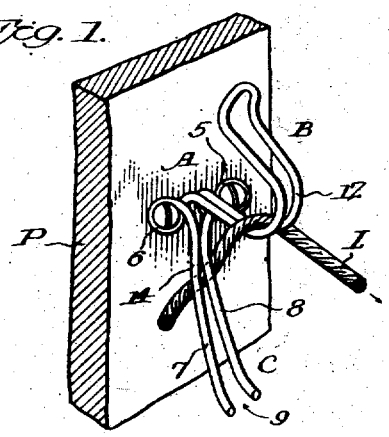
Figure 1 is a perspective view of my device showing one way of securing a line thereby.

The clothes line L is passed once around the hook B as shown in Figure 1 and is then passed down and back of the locking part C, in which position it is clamped sufficiently tight for ordinary use.

Figure 2:
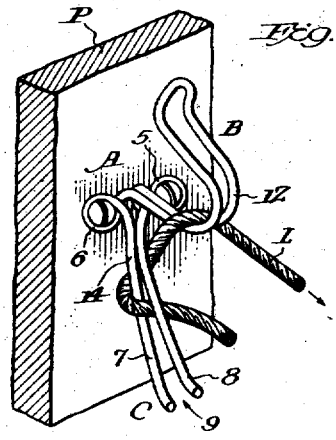
Figure 2 is a similar view showing a further securing feature.

By passing the free end of the line around the member 7 and between it and the member 8, as shown in Figure 2, a further hold is secured.

While in the foregoing I have described specific embodiments and have mentioned only certain possible modifications, it will be appreciated that in practice I do not limit myself to such specific details as herein set forth, but may resort to any practical modifications falling within the scope of the claims.

Having thus described my invention what I claim and desire to secure to me by Letters Patent of the United States is:

1. In clothes line supports, a base member comprising two eyelets, a line supporting member, and a line securing member bent to form a third point of support with the eyelets when under tension and then to diverge from the plane of the support to form a wedging recess therewith.

2. In clothes line holders, a resilient rod bent to form a base including eyelets for support, an outstanding hooked member for line attachment, and resilient depending clamping arms bent to form a third point of support with the eyelets when under tension and then to diverge from the plane of the support to form a wedging recess therewith and from each other to form a second wedging recess therebetween.

3. As an improved article of manufacture, a clothes-line holder of wire bent together intermediate its ends and then bent as one to form a U-shaped line support hook; then bent away from each other and each completely doubled upon itself to form spaced eyelets for two fastening supports in one plane, then bent forwardly, downwardly, and then backwardly as one to the plane of the eyelets to form a third point of support with the eyelets, from which point the free ends are bent forwardly from the plane of support to form a wedging recess therewith and away from each other to form a second wedging recess therebetween as and for the purpose specified.

4. A clothes line holder comprising a base adapted to be secured to a support, a line engaging hook integral with and extending forward from the base, and two members extending from the base in a direction substantially at right angles to said hook and separated by a space which is gradually reduced in width from its outer end toward the base.

5. A clothes line holder comprising a base adapted to be secured to a support, a line engaging hook integral with and extending forward from the base, and two members extending from the base in a direction substantially at right angles to said hook and separated by a space which is gradually reduced in width from its outer end toward the base, said members being also positioned at such an angle to the base as to provide a wedging recess between them and the support to which the holder is secured.

6. A clothes line holder comprising a base adapted to be secured to a support, a line engaging hook integral with and extending forward and upward from the base, and line engaging means extending downward from the base at such an angle as to provide a wedging recess with the support to which the base is secured.

7. A clothes line holder formed of a section of wire or suitable rod bent to provide a base, adapted to be secured to a support, a line engaging hook extending forward from the base, and additional line engaging means projecting from the base at such an angle as to form with the support to which the holder is secured a wedging recess.

8. A clothes line holder formed of a section of wire or suitable rod bent to provide a hook, eyes arranged at opposite sides of said hook and constituting a base by which the holder can be secured to a support, and resilient end members extending at such an angle to said eyes as to form with the support to which the holder is secured a wedging recess.

9. A clothes line holder formed of a section of wire or suitable rod bent to provide a hook, eyes arranged at opposite side of said hook and constituting a base by which the holder can be secured to a support, and resilient end members extending at such an angle to said eyes as to form with the support to which the holder is secured a wedging recess, said end members being separated by a space that is gradually reduced in width from the ends of said members toward said eyes.

FRED O. LAKE.